US006878003B2

(12) United States Patent
Natori

(10) Patent No.: US 6,878,003 B2
(45) Date of Patent: Apr. 12, 2005

(54) CARD SLOT ASSEMBLY WITH ELECTRICALLY-CONTROLLABLE EJECTION MECHANISM

(75) Inventor: Akira Natori, Fussa (JP)

(73) Assignee: Japan Aviation Electronics Industry, Limited, Tokyo (JP)

( * ) Notice: Subject to any disclaimer, the term of this patent is extended or adjusted under 35 U.S.C. 154(b) by 0 days.

(21) Appl. No.: 10/618,318

(22) Filed: Jul. 11, 2003

(65) Prior Publication Data

US 2004/0009690 A1 Jan. 15, 2004

(30) Foreign Application Priority Data

Jul. 11, 2002 (JP) ........................................ 2002-203215

(51) Int. Cl.$^7$ ............................................. H01R 13/62
(52) U.S. Cl. ........................................................ 439/159
(58) Field of Search ................................. 439/159, 911

(56) References Cited

U.S. PATENT DOCUMENTS 5,077,722 A * 12/1991 Geist et al. ................. 369/75.1

FOREIGN PATENT DOCUMENTS

| JP | 8-161233 | 6/1996 |
| JP | 2000-340293 | 12/2000 |

* cited by examiner

Primary Examiner—Phuong Dinh
(74) Attorney, Agent, or Firm—Michael Best & Friedrich LLP

(57) ABSTRACT

An ejection plate is urged by a coil spring to be positioned at an ejecting position. When a card is received within a card slot assembly, the ejection plate is moved, by the received card, from the ejecting position to a locked position, opposing the coil spring. A locking member, which is rotatably supported by a pivot, locks the ejection plate to the locked position. A solenoid mechanism supports a rod member so that the rod member is movable in an axial direction of the rod member. The movement of the rod member in the axial direction thereof is converted by a crank member into a rotation force, which is provided for the locking member. The rotation force rotates the locking member so that the locking member unlocks the ejection plate. Thus, the ejection plate is moved from the locked position to the ejecting position by the coil spring so that the card is ejected form the card slot assembly.

12 Claims, 14 Drawing Sheets

CARD SLOT ASSEMBLY WITH ELECTRICALLY-CONTROLLABLE EJECTION MECHANISM

The present application claims priority to prior Japanese patent application JP 2002-203215, the disclosure of which is incorporated herein by reference.

BACKGROUND OF THE INVENTION

This invention relates to a card slot assembly, which is installed in an electronic instrument such as a personal computer and receives a card such as an IC card or a memory card to enable the electronic instrument to access the card for data transmission, for example, data writing and/or data reading. In particular, this invention relates to a card ejection mechanism provided for the card slot assembly to eject the received card from the card slot assembly.

A card slot assembly with a card ejection mechanism is disclosed in JP-B 3200736. The card slot assembly comprises a card receiving portion and can receive a card along an insertion direction through the card receiving portion. The card slot assembly is provided with an ejection plate, a coil spring, a pivot, a locking member and an eject button. The ejection plate is movable along the insertion direction between a locked position and an ejecting position. The coil spring is coupled to the ejection plate and urges the ejection plate to be positioned at the ejecting position. The locking member is an elongated plate and is rotatably supported by the pivot. When the card is received within the card slot assembly, the ejection plate is moved to the locked position by a force caused by the insertion of the card. At that time, the locking member rotates around the pivot in a first rotational direction, and one end of the locking member stops the ejection plate to lock the ejection plate at the locked position, opposing the coil spring. When the eject button is operated, the locking member rotates around the pivot in a second rotational direction reverse to the first rotational direction. Thereby, the locking member unlocks the ejection plate, and the ejection plate is moved to the ejecting position by the coil spring. Therefore, the card is pressed out by the moving ejection plate and is ejected from the card slot assembly.

There is a problem that, if the eject button is operated by mistake, the card is ejected from the card slot assembly even when the card is accessed by the electronic instrument. As a result, the data transmission between the card and the electronic instrument is broken.

JP-A 8-161233 discloses another assembly, which uses a solenoid mechanism for restricting the movement of an eject button when the card is accessed by the electronic instrument. For the ejection of the card, after the solenoid mechanism is forced not to work on the movement of the eject button, for example, by cutting the power supply to the solenoid mechanism, the eject button is operated.

SUMMARY OF THE INVENTION

It is an object of the present invention to provide a card slot assembly which can eject a card therefrom without operating an eject button.

This invention is directed to a card slot assembly which has a card receiving portion for receiving a card in an insertion direction within the card slot assembly. According to this invention, the card slot assembly comprises card ejector, which is movable along the insertion direction between a locked position and an ejecting position, wherein the card ejector moves to the locked position when the card is received within the card slot assembly, while the card ejector exerts on the received card an ejection force in an ejection direction opposite to the insertion direction when the card ejector moves from the locked position to the ejecting position; actuator, which is coupled to the card ejector and urges the card ejector to be positioned at the ejecting position; a pivot; a locking member, which is rotatably supported by the pivot, wherein a rotational range of the locking member is between a first rotational position and a second rotational position, the locking member locks the card ejector at the locked position when the locking member is positioned at the first rotational position, and the locking member unlocks the card ejector when the locking member is positioned at the second rotational position, so as to allow the card ejector to move in the ejecting direction in accordance with the actuator; a solenoid mechanism supporting a rod member movably in an axial direction of the rod member between a first rod position and a second rod position; and crank mechanism, which is coupled to the rod member and is positioned close to the locking member, wherein, when the rod member moves from the first rod position to the second rod position, the crank mechanism converts the movement of the rod member into a rotation force and rotates the locking member from the first rotational position towards the second rotational position by means of the rotation force.

According to another aspect of this invention, the card slot assembly may further comprise compelling means for compelling the locking member to be positioned at the first rotational position so that, when the rod member moves from the first rod position to the second rod position, the crank mechanism supplies the rotation force on the locking member, opposing the compelling means.

According to another aspect of this invention, the card slot assembly may further comprise a switch and a slider slidable along the insertion direction in accordance with the movement of the card being received within the card slot assembly, wherein the slider is provided with a control portion which turns on the switch when the card is completely received within the card slot assembly and which turns off the switch when the card is ejected from the card slot assembly.

Preferred developments of the invention are defined in the dependent claims and the method claim thereof.

DESCRIPTION OF PREFERRED EMBODIMENTS

With reference to FIGS. 1 to 21, a card slot assembly 200 is of a type which is installed in an electronic instrument such as a personal computer. The card slot assembly 200 has a card receiving portion 201 on the rear end thereof, as shown in FIGS. 1 to 7 and 9. As especially shown in FIG. 9, the card receiving portion 201 has a rectangular cross section in a plane perpendicular to a Y-direction, i.e. an XZ plane defined by an X-direction and a Z-direction. As shown in FIGS. 1 to 4, a card 300 such as an IC card, a memory card or a PC card can be inserted through the card receiving portion 201 along the Y-direction and can be received within the card slot assembly 200. As understood from the above, the Y-direction is an insertion direction of the card 300. The inserted and received card 300 can be accessed by the electronic instrument.

Figure 3:
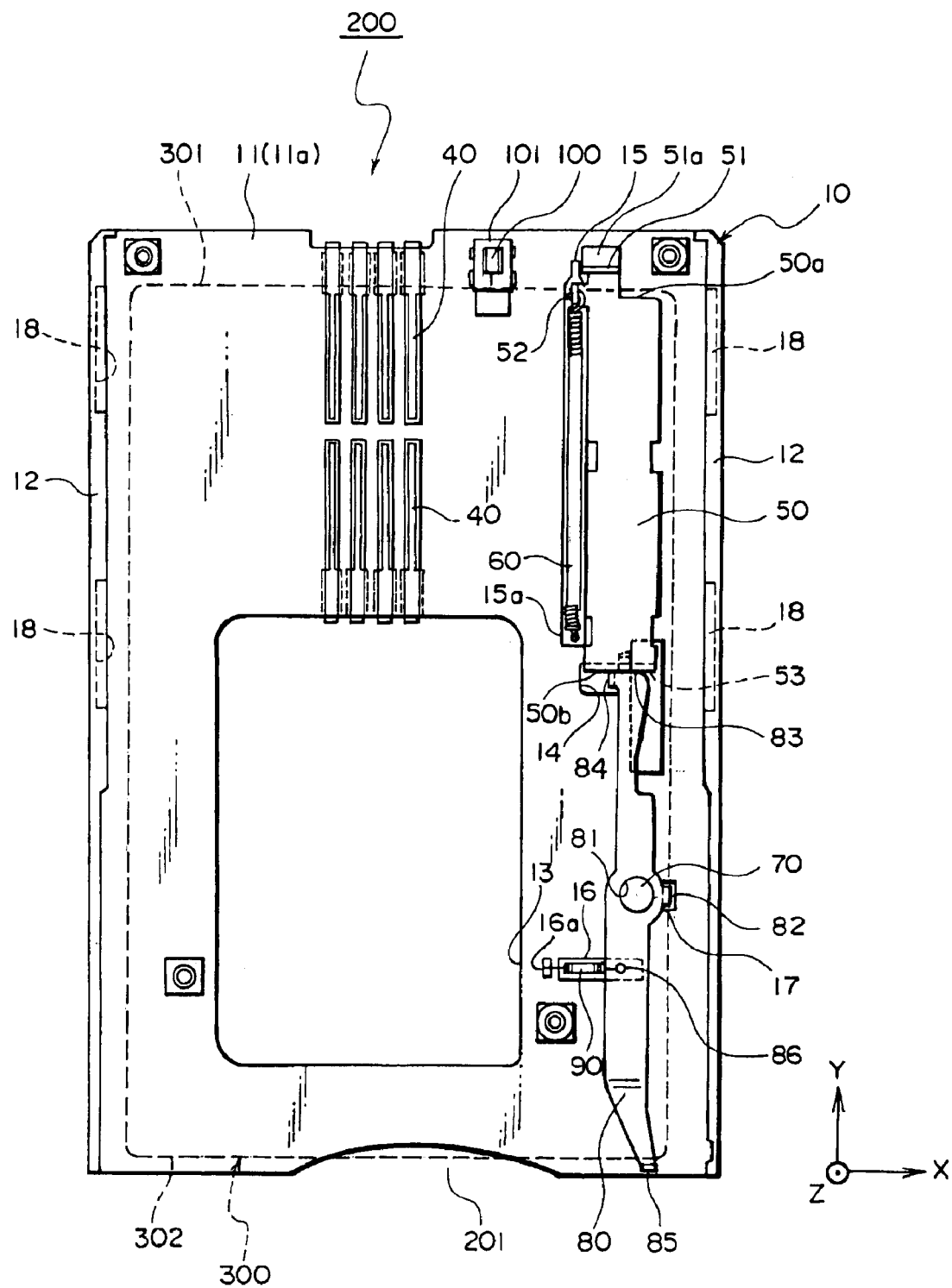
FIG. 3 is a top view showing the card slot assembly of FIG. 1 under the locked state, wherein a slider and covers are removed.
Figure 4:
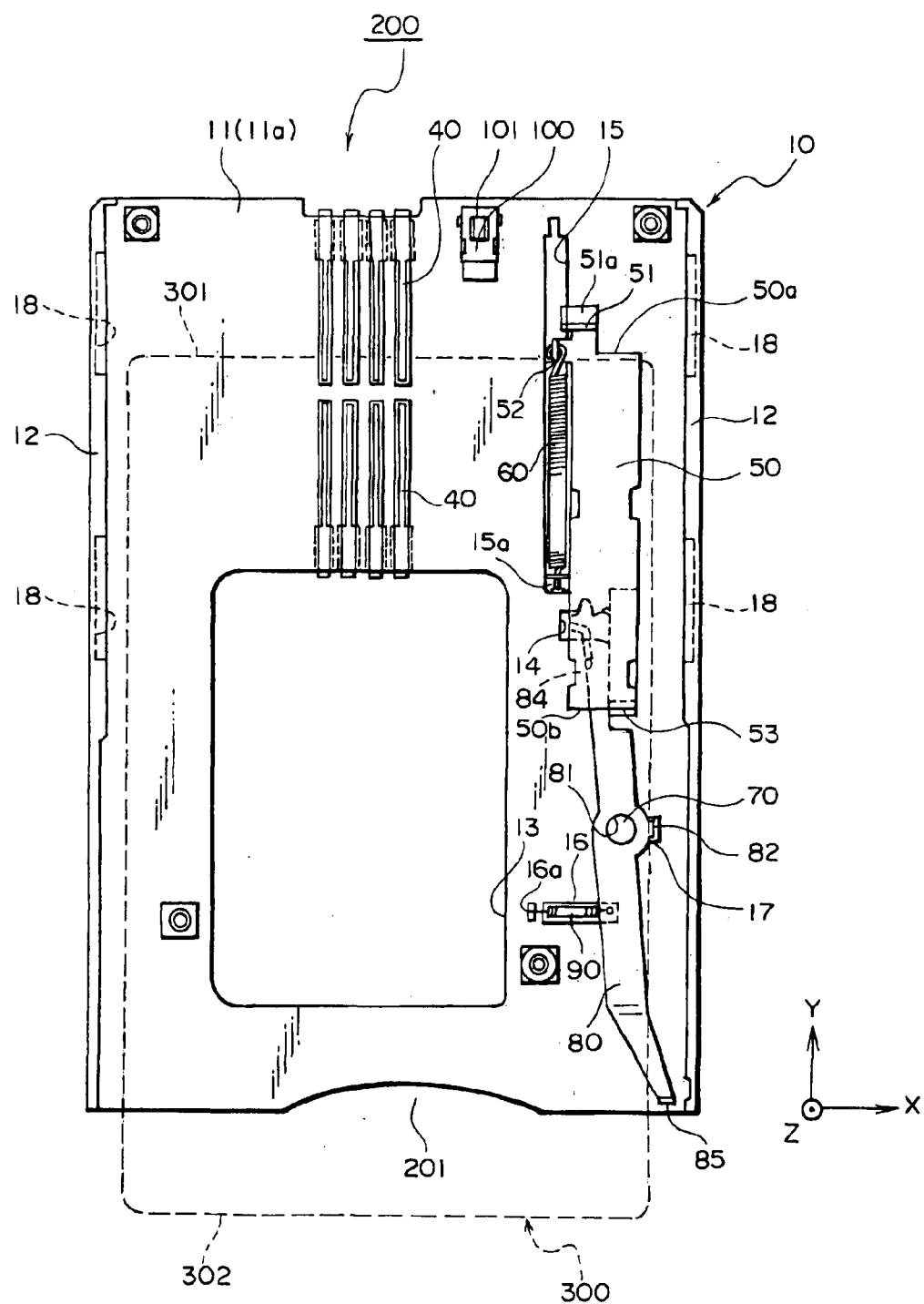
FIG. 4 is a top view showing the card slot assembly of FIG. 1 under the unlocked state, wherein a slider and covers are removed.

As shown in FIGS. 3 to 6 and 9, the card slot assembly 200 comprises a base insulator 10, which has a main plate 11 and two side walls 12. As shown in FIGS. 3 to 5, 7 and 9, the main plate 11 has top and bottom surfaces 11a, 11b. The side walls 12 are positioned at the right and the left sides of the main plate 11 in the X-direction and extend in the Z-direction, as shown in FIGS. 3 and 4. As especially shown in FIG. 9, the base insulator 10 generally has a U-shaped cross-section in the XZ plane.

With the front end of the base insulator 10, a front cover 21 is fitted as shown in FIGS. 1, 2, 7 and 8. On or above the top surface 11a of the main plate 11, a cover plate 22 and a slider 30 are disposed. The cover plate 22 has a half size of the main plate 11 in the XY plane and covers the rear half of the main plate 11. The cover plate 22 and the base insulator 10 define the card receiving portion 201 at the rear end of the card slot assembly 200, as especially shown in FIG. 9.

Figure 1:
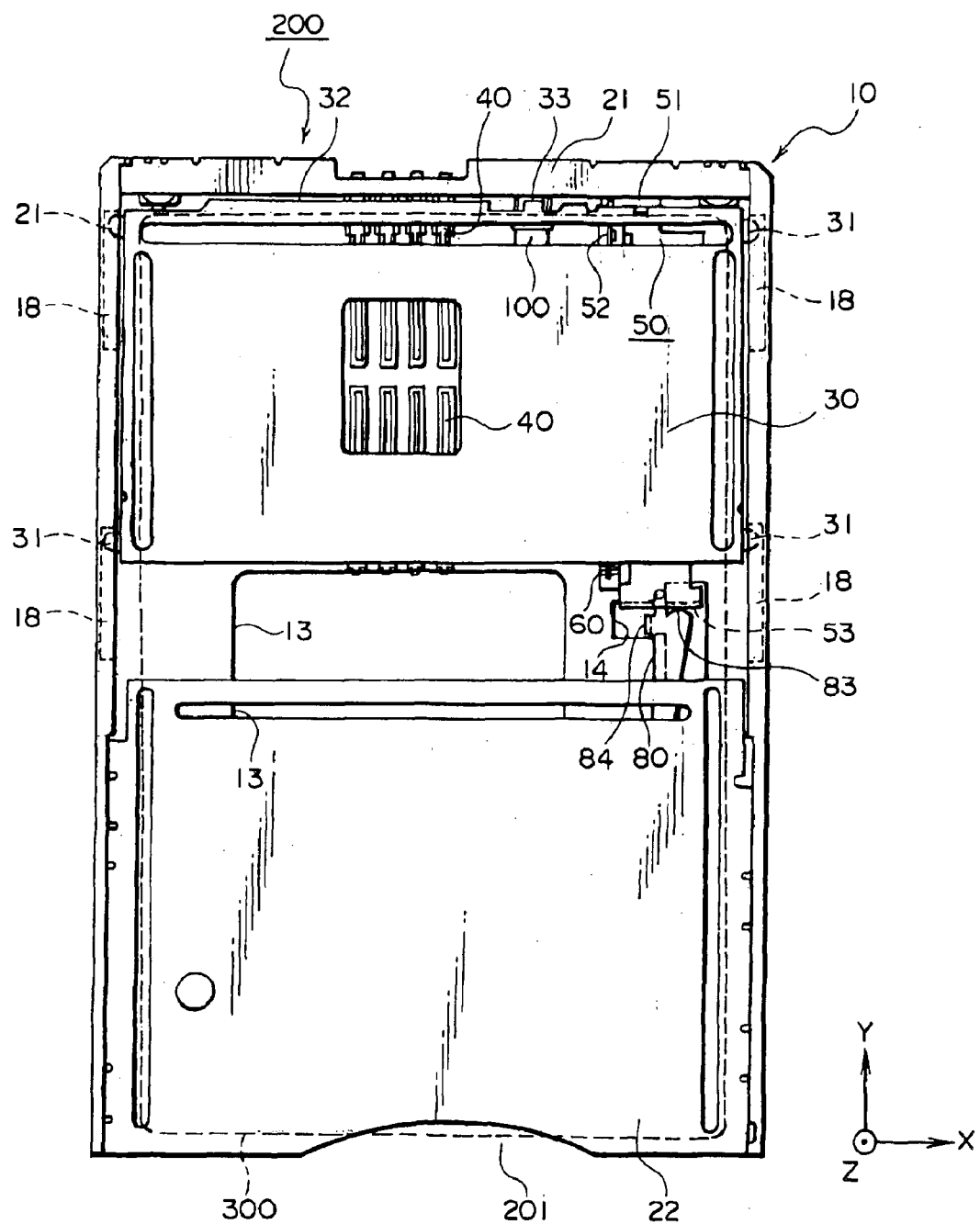
FIG. 1 is a top view showing a card slot assembly according to an embodiment of the present invention, wherein the card slot assembly is in a locked state.
Figure 2:
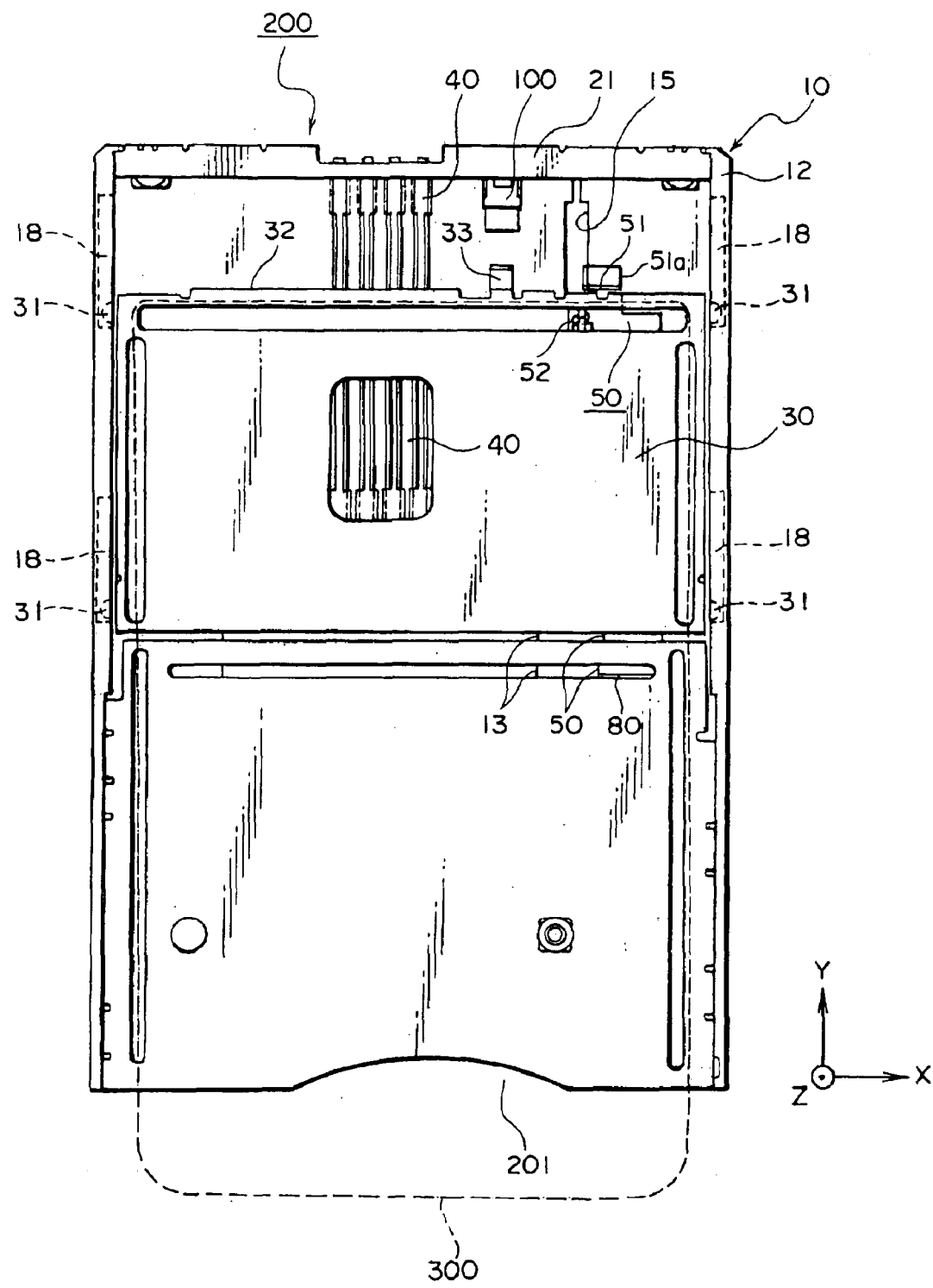
FIG. 2 is a top view showing the card slot assembly of FIG. 1, wherein the card assembly is in an unlocked state.
Figure 10:
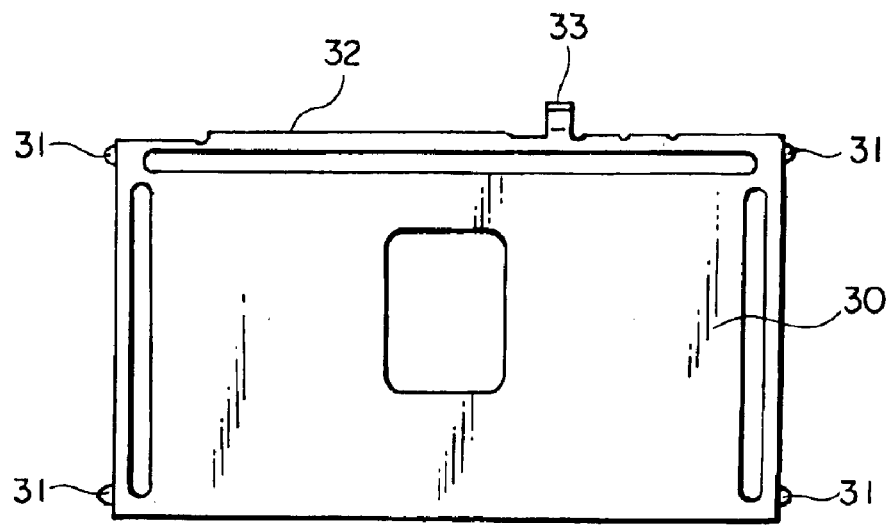
FIG. 10 is a top view of the slider illustrated in FIG. 1.
Figure 11:
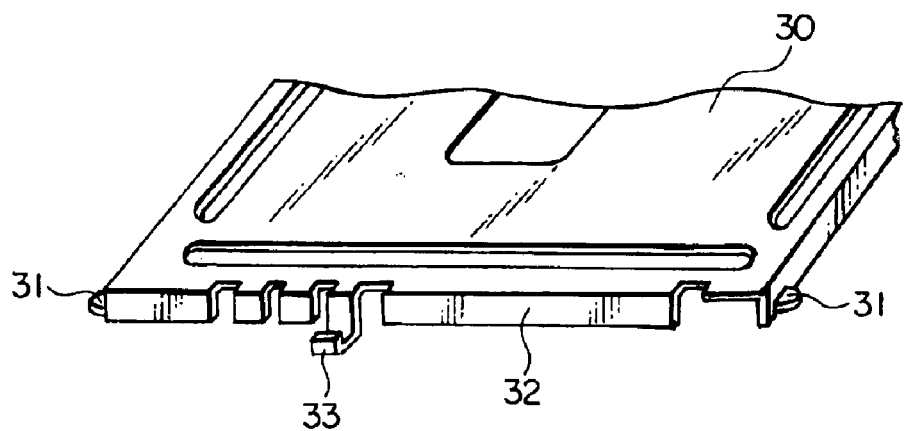
FIG. 11 is a partial, perspective view of the slider illustrated in FIG. 1.

As shown in FIGS. 1 and 2, the slider 30 has a size of about one-third of the main plate 11 and is movable between the front cover 21 and the cover plate 22. The slider 30 is provided with four guided projections 31, as shown in FIGS. 1, 2 and 10. Each two guided projections 31 are formed at the corresponding side of the slider 30. Each of the guided projections 31 is positioned at the lowest part of the slider 30 in the Z-direction, as shown in FIG. 11. The slider 30 is also provided with a front wall 32 and a control portion 33 which projects from the front wall 32, as shown in FIG. 11. As shown in FIGS. 1 and 2, the front wall 32 is brought into contact with a front end 301 of the card 300 during the card insertion/ejection. In detail, during the card insertion, the front end 301 presses the front wall 32, and the slider 30 is moved by the inserted card 300 to a position shown in FIG. 1, which position is referred to as a locked position. On the other hand, during the card ejection, the slider 30 is moved to a position shown in FIG. 2, which position is referred to as an unlocked position. In other words, the slider 30 can move in the Y-direction between the locked position and the unlocked position. The reason of the references of these positions will be made clear in the following explanations about other components.

As seen from FIGS. 3 to 5, 7 and 9, the main plate 11 is provided with an aperture 13, which is positioned at the middle of the main plate 11 in the X-direction and nearer to the rear end of the main plate 11 than to the front end thereof. In the main plate, an opening 14 is also formed. The opening 14 is positioned between the aperture 13 and the right side wall 12. As seen from the left side of the base insulator 10, the opening 14 has a generally T-like shape, which has one edge extending in the Y-direction and the other edge extending therefrom in the X-direction. The main plate 11 is further formed with a first spring accommodation slit 15, which is positioned between the aperture 13 and the opening 14 in the X-direction and is positioned nearer to the front end of the main plate 11 than the opening 14 in the Y-direction. The first spring accommodation slit 15 extends in the Y-direction and has at the rear end thereof a hooked portion 15a. The main plate 11 is also formed with a second spring accommodation slit 16, which is positioned nearer to the rear end of the main plate 11 than the opening 14 in the Y-direction. The second spring accommodation slit 16 extends in the X-direction and has at the left end thereof a hooked portion 16a. In the main plate 11a, a restriction slit 17 is formed. The restriction slit 17 is positioned between the opening 14 and the second spring accommodation slit 16 in the Y-direction and is positioned nearer to the right side wall 12 than the second spring accommodation slit 16 in the X-direction. The restriction slit 17 extends in the Y-direction.

As shown in FIGS. 1 and 2, each of the side walls 12 is provided with two slider guide grooves 18, each of which accommodates the corresponding guided projection 31 of the slider 30. The guided projection 31 is able to move within the corresponding slider guide groove 18 in accordance with the movement of the slider 30 in the Y-direction, as seen from FIG. 20.

Figure 20:
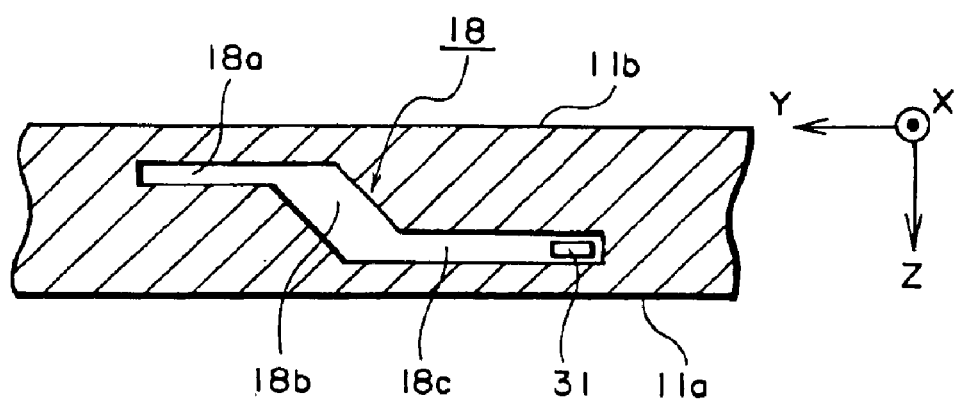
FIG. 20 is a partial, enlarged, cross-sectional view corresponding to FIG. 8 and showing a base insulator and the slider.

As also shown in FIG. 20, each of the slider guide grooves 18 has first to third portions 18a, 18b, 18c. The first and the third portions 18a and 18c extend in planes perpendicular to the Z-direction. The first portion 18a is positioned near to the front end of the side wall 12, while the third portion is positioned near to the rear end of the side wall 12. The first portion 18a is nearer to the bottom surface 11b of the main plate 11 than the third portion 18c. The second portion 18b extends in a direction oblique to the Y- and the Z-directions and connects the first and the third portions 18a, 18c. With the structures of the slider guide grooves 18, when the card 300 is inserted into the card slot assembly 200 and the slider 30 moves in the Y-direction from the unlocked position to the locked position, the guided projections 31 are guided by the slider guide grooves 18, respectively, so that the slider 30 goes down towards the bottom surface 11b of the main plate 11 of the base insulator 10. The moving the slider 30 in the Z-direction presses the inserted card 300 on the top surfaces 11a of the main plate 11. Therefore, contacts 40, which are arranged and formed on the top surface 11a of the main plate 11, can be suitably connected to contacts of the card 300, which are not shown.

Figure 12:
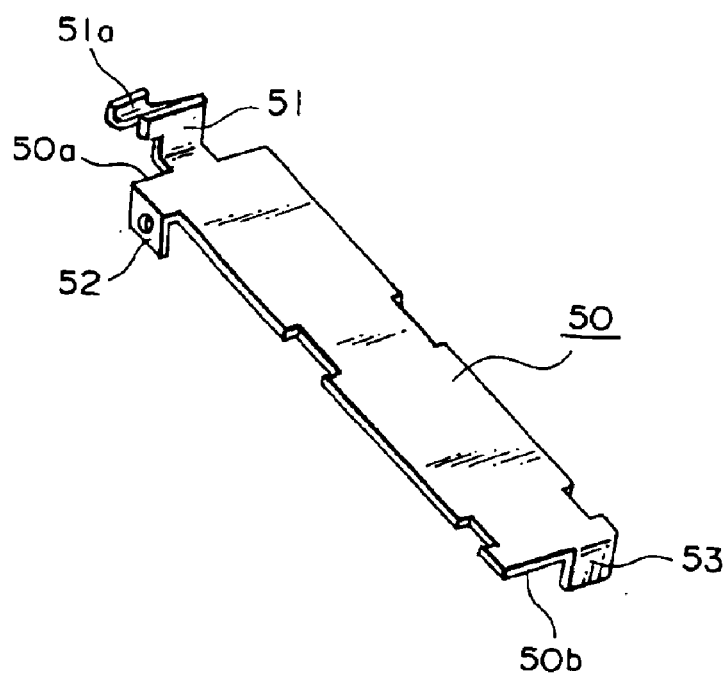
FIG. 12 is a perspective view of an ejection plate which is shown in FIG. 3.

As shown in FIGS. 3 and 4, an ejection plate 50 as a card ejector is provided on the top surface 11a of the main plate 11 of the base insulator 10. The ejection plate 50 is elongated in the Y-direction and has front and rear ends 50a, 50b. As shown in FIGS. 3, 4 and 12, a standing-wall portion 51 and a hooked portion 52 are formed at the front end 50a of the ejection plate 50, while a locked portion 53 is formed at the rear end 50b of the ejection plate 50. The standing-wall portion 51 extends upwards while the hooked portion 52 and the locked portion 53 extend downwards. As shown in FIGS. 3 and 4, the hooked portion 52 is positioned within the first spring accommodation slit 15 so that it is able to move within the first spring accommodation slit 15 in the Y-direction. The locked portion 53 is positioned within the opening 14 so that it is able to move within the opening 14 in the Y-direction. As shown in FIGS. 1 and 2, the standing-wall portion 51 is in contact with the front wall 32 of the slider 30. Therefore, when the ejection plate 50 goes rearwards, the slider 30 also goes rearwards. Conversely, when the slider 30 goes forwards, the ejection plate 50 also goes forwards. In this embodiment, as shown in FIGS. 3, 4 and 12, the standing-wall portion 51 is provided with a portion 51a, which serves to prevent the ejection plate from moving forwards to an unexpected position, i.e., a position nearer to the front end of the card slot assembly 200 than the locked position.

An actuator is provided to urge the ejection plate 50 to its ejecting position. In detail, a coil spring 60 is accommodated, as the actuator, within the first spring accommodation slit 15, as shown in FIGS. 3 and 4. One end of the coil spring 60 is coupled to the hooked portion 15a of the first spring accommodation slit 15, while the other end of the coil spring 60 is coupled to the hooked portion 52 of the ejection plate 50. The coupling between the coil spring 60 and the ejection plate 50 is established within the first spring accommodation slit 15. The coil spring 60 pulls the hooked portion 52 rearwards and urges the ejection plate 50 to be positioned at the unlocked position or the ejecting position.

As shown in FIGS. 3 and 4, a pivot 70 is provided on the top surface 11a of the main plate 11 of the base insulator 10. In this embodiment, the pivot 70 is formed integral with the main plate 11. The position of the pivot 70 is between the openings 14 and the second spring accommodation slit 16 and near to the restriction slit 17.

Figures 13, 14:
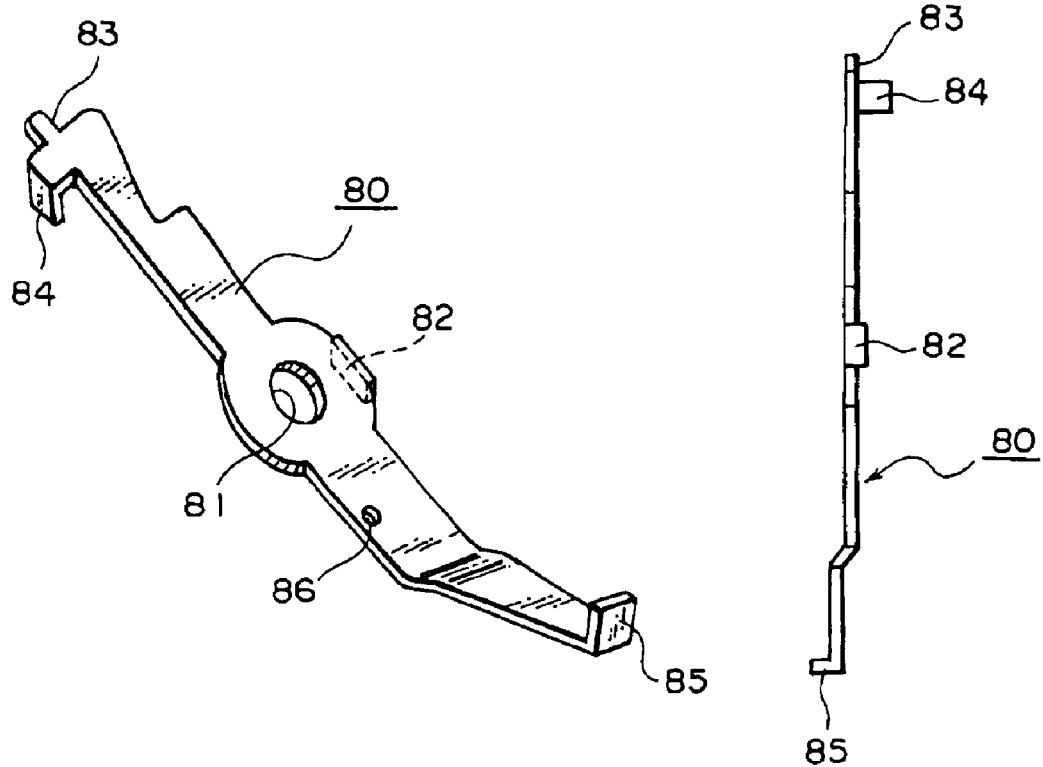
FIG. 13 is a perspective view of a locking plate which is shown in FIG. 3.
FIG. 14 is a side view of the locking plate of FIG. 13.

On the top surface 11a of the main plate 11 of the base insulator 10, a locking member 80 is provided, as shown in FIGS. 3 and 4. The locking member 80 is provided with a center hole 81, as shown in FIG. 13. Into the center hole 81, the pivot 70 is inserted and fitted so that the locking member 80 is rotatably supported by the pivot 70. The locking member 80 has a protrusion 82 at a position near to the center hole 82, as shown in FIG. 13. The protrusion 82 is accommodated within the restriction slit 17 and is movable within the restriction slit 17. The protrusion 82 and the restriction slit 17 serve to restrict a rotation range of the locking member 80 to a predetermined rotation range, which includes a first rotational position shown in FIG. 3 and a second rotational position shown in FIG. 4.

The locking member 80 has first and second ends. The first end is near to the front end of the card slot assembly 200, while the second end is near to the rear end of the card slot assembly 200. The center hole 81 mentioned above is positioned between the first and the second ends of the locking member 80.

On the first end of the locking member 80, a locking portion 83 is formed, as shown in FIGS. 13 and 14. The locking portion 83 has an L-like shape, one edge of which is always positioned between the ejection plate 50 and the top surface 11a of the main plate 11 of the base insulator 10, as shown in FIGS. 3 and 4. As shown in FIG. 3, when the locking member 80 is positioned at the first rotational position, a corner portion of the L-shaped locking portion 83 is brought into contact with the locked portion 53 of the ejection plate 50 and supports the rear side of the locked portion 53 so as to lock the ejection plate 50 at the locked position, opposing the coil spring 60. As shown in FIG. 4, when the locking member 80 is positioned at the second rotational position, the locking portion 83 is moved away from the locked portion 53 of the ejection plate 50 and unlocks the ejection plate 50. Therefore, the ejection plate 50 is allowed to be moved rearwards in accordance with the force of the coil spring 60. In this case, the moving direction of the ejection plate 50 is a direction opposite to the insertion direction and is referred to as an ejecting direction because the card 300 is ejected from the card slot assembly 200 upon the movement of the ejection plate 50 in this direction.

Figure 7:
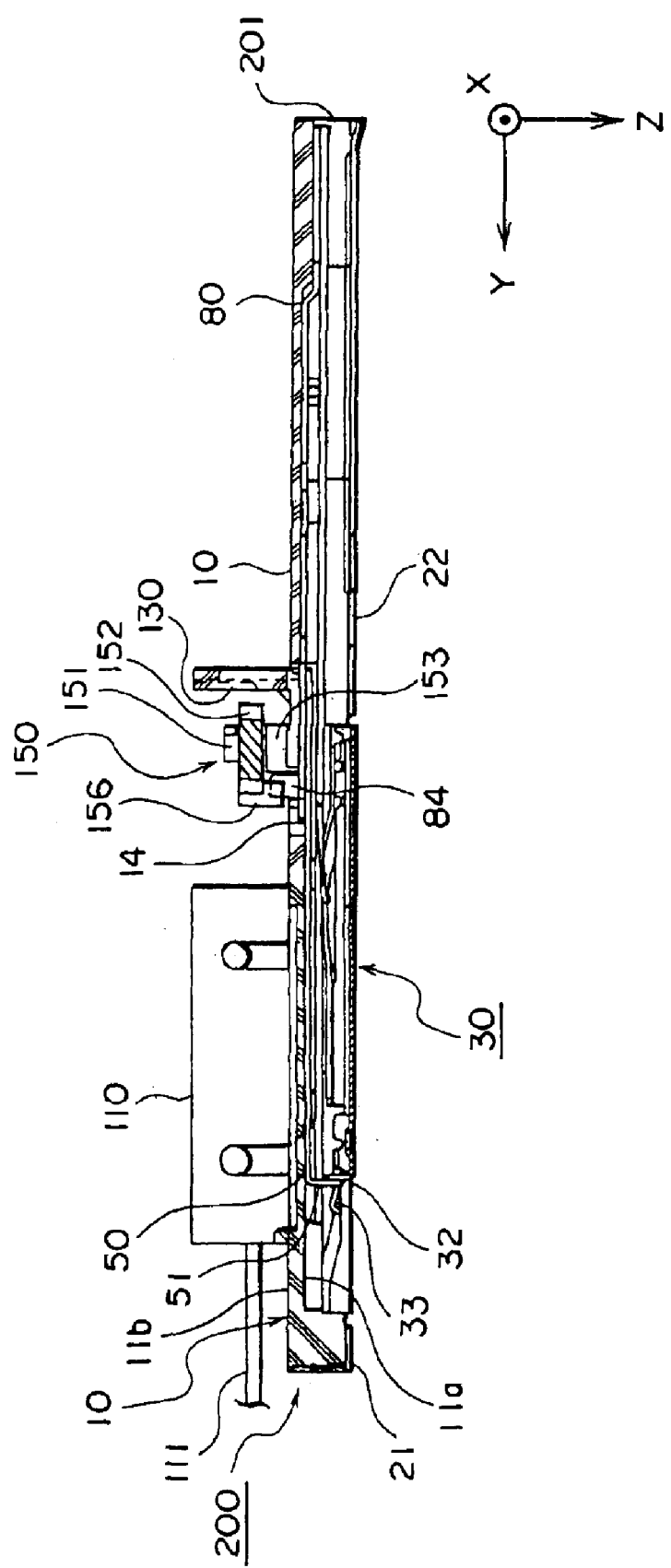
FIG. 7 is a cross-sectional side view showing the card slot assembly of FIG. 5, taken along lines VII—VII.
Figure 8:
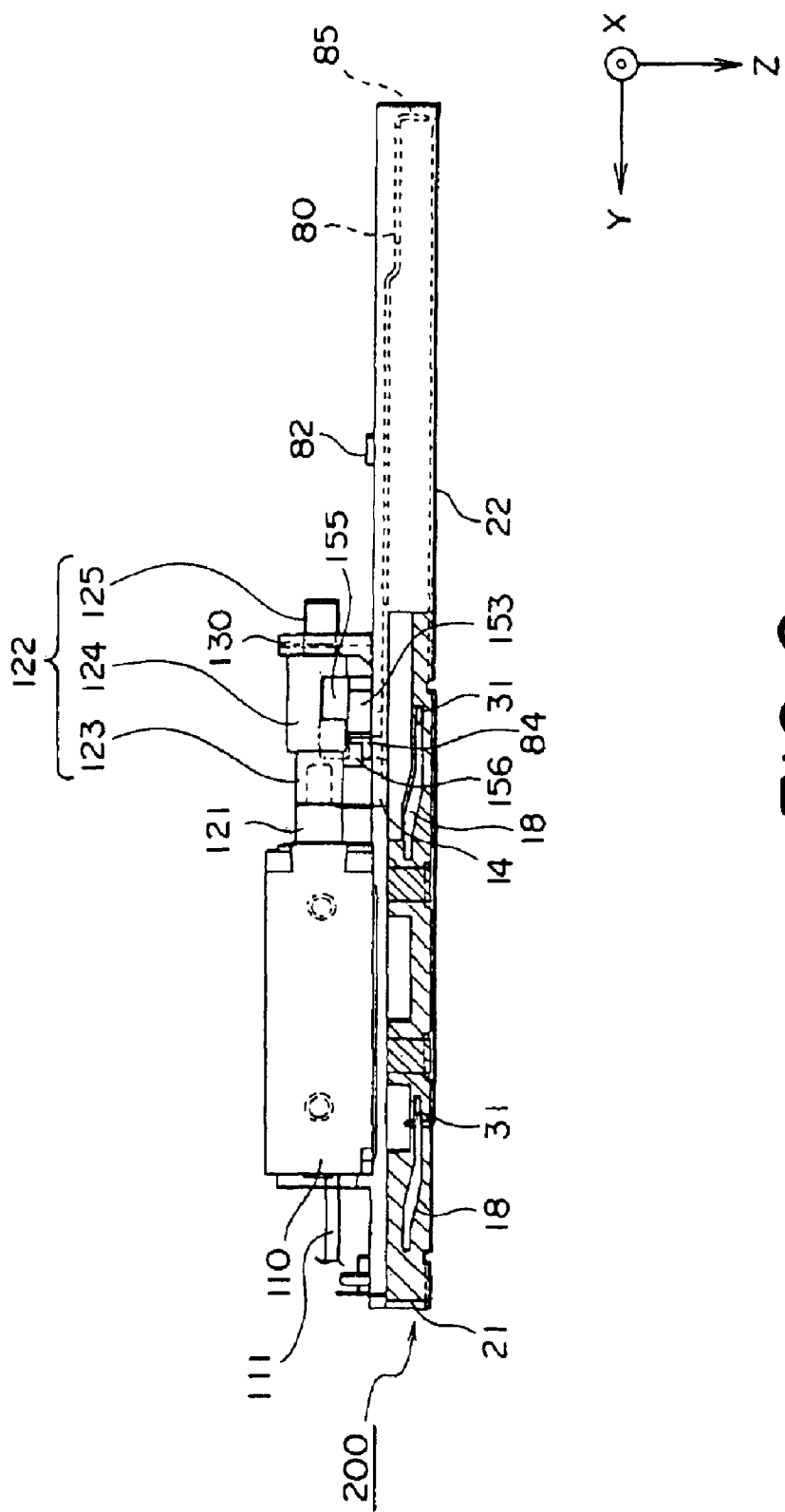
FIG. 8 is a side view showing the card slot assembly of FIG. 5, wherein the card slot assembly is partially cut away along lines VIII—VIII.
Figure 9:
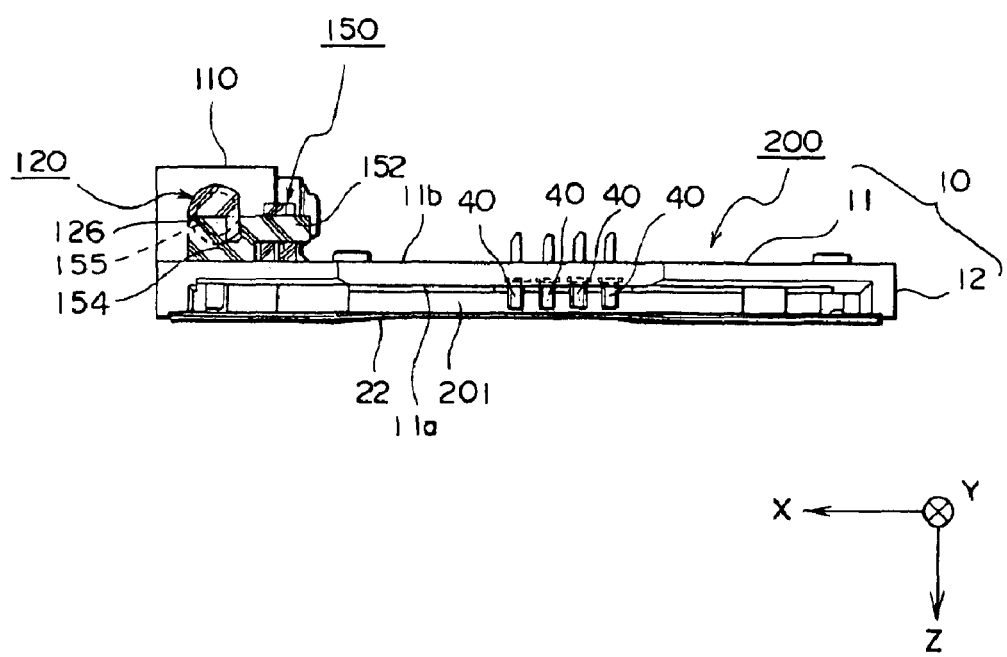
FIG. 9 is a rear view showing the card slot assembly of FIG. 5, wherein the card slot assembly is partially cut away along lines IX—IX.

On the first end of the locking member 80, a pressed portion 84 is also formed, as shown in FIGS. 13 and 14. The pressed portion 84 projects in the same direction of the protrusion 82, as shown in FIG. 14. The pressed portion 84 is accommodated in the opening 14 and is able to move within the opening 14, as shown in FIGS. 3 and 4. The pressed portion 84 projects over the bottom surface 11b of the main plate 11 of the base insulator 10, as shown in FIG. 7.

On the second end of the locking member 80, a stopper portion 85 is formed, as shown in FIGS. 13 and 14. The stopper portion 85 projects in a direction opposite to the direction of the pressed portion 84. When the locking member 80 is positioned at the first rotational position, the stopper portion 85 is positioned nearer to the rear end of the card slot assembly 200 than a rear end 302 of the card 300, as shown in FIG. 3. In other words, the stopper portion 85 gets the back of the card 300. Thus, the stopper portion 85 can prevent the card 300 from going out of the card slot assembly 200 when the locking member 80 is positioned at the first rotational position. When the locking member 80 is positioned at the second rotational position, the stopper portion 85 moves to a position near the right side wall 12 of the base insulator 10 and does not obstruct the movement of the card 300 in the Y-direction, as shown in FIG. 4.

Between the center hole 81 and the stopper portion 85 of the locking member 80, a hooked hole 86 is formed, as shown in FIGS. 3, 4, 13, and 14. To the hooked hole 86, one end of a spring 90 is coupled, as shown in FIGS. 3 and 4. The spring 90 is accommodated within the second spring accommodation slit 16, and the other end of the spring 90 is coupled to the hooked portion 16a. The spring 90 pulls the rear half of the locking member 80 towards the left side of the insulator 10 in FIGS. 3 and 4 and compels the locking member 80 to be positioned at the first rotational position.

On the main plate 11 of the base insulator 10, a switch 100 is provided. The position of the switch 100 is near to the front end of the card slot assembly 200 in the Y-direction, as shown in FIGS. 3 and 4, and corresponds to the position of the control portion 33 of the slider 30 in the X-direction, as shown in FIGS. 1 and 2. The switch 100 has a controlled portion 101, as shown in FIGS. 3 and 4. When the slider 30 is under the locked state, the controlled portion 101 is controlled by the control portion 33 of the slider 30 so that the switch 100 turns on. When the slider 30 is under the unlocked state, the control portion 33 is away from the controlled portion 101 so that the switch 100 turns off. By detecting the condition of the switch 100, it can be judged whether the card 300 is completely received in the card slot assembly 200.

Figure 5:
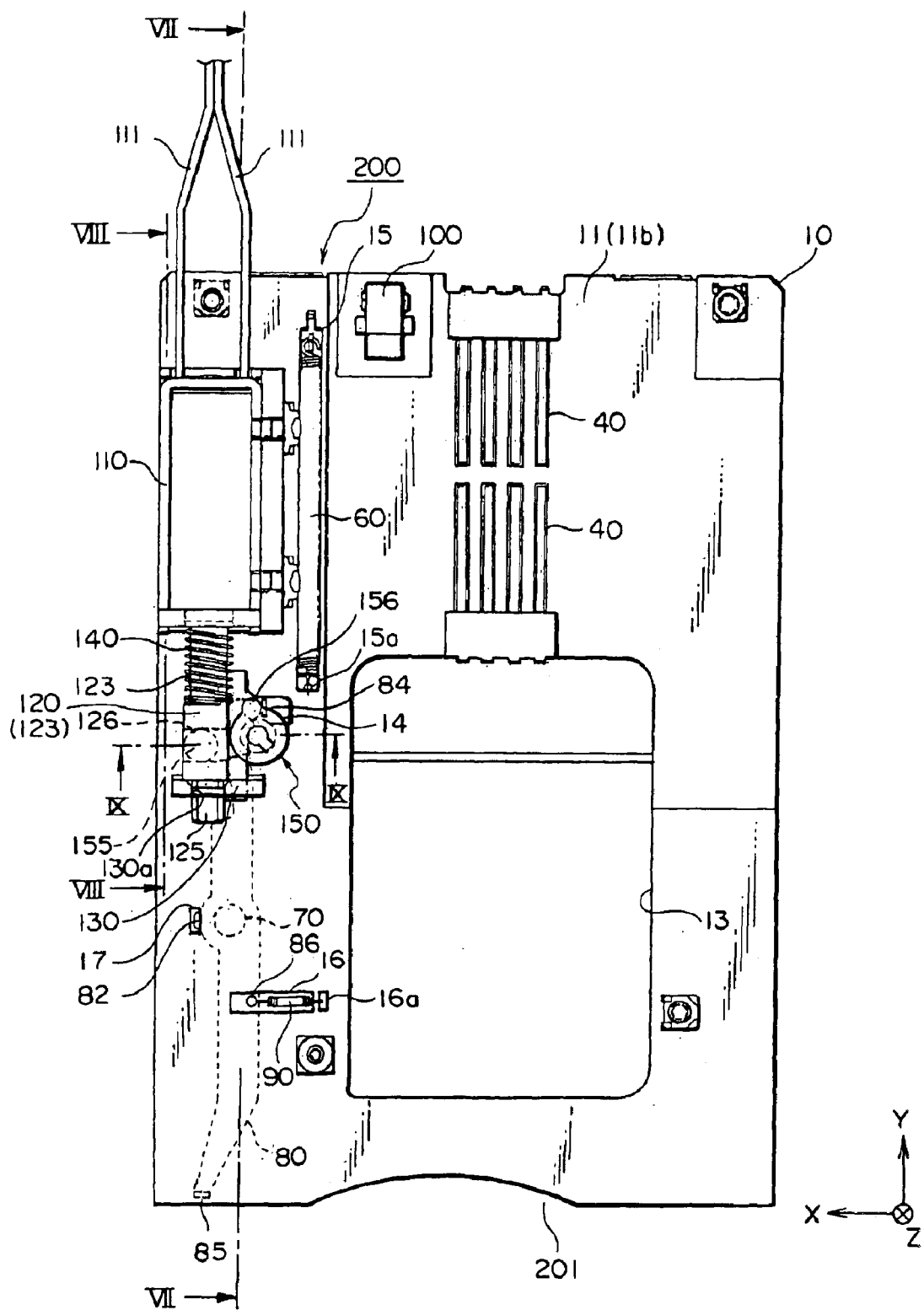
FIG. 5 is a bottom view showing the card slot assembly of FIG. 1 under the locked state.
Figure 6:
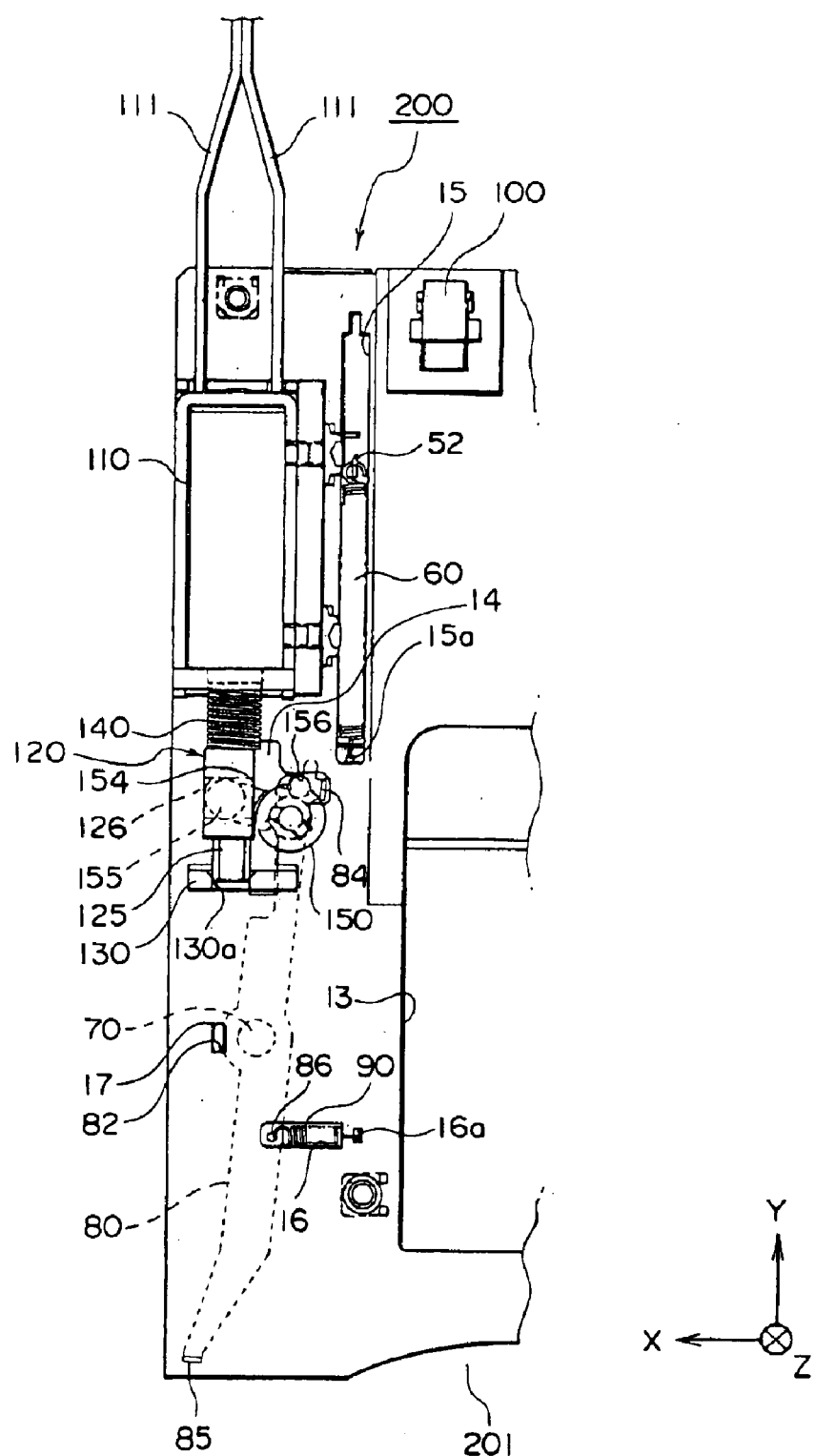
FIG. 6 is a partial bottom view showing the card slot assembly of FIG. 1 under the unlocked state.

On the bottom surface 11b of the main plate 11 of the base insulator 10, a solenoid mechanism 110 is provided, as shown in FIGS. 5 to 9. The solenoid mechanism 110 has power supply lines 111, as shown in FIGS. 5 to 8. The solenoid mechanism 110 movably supports a rod member 120 in an axial direction of the rod member 120, as shown in FIGS. 5 and 6. In this embodiment, the axial direction of the rod member 120 is the Y-direction.

Figure 19:
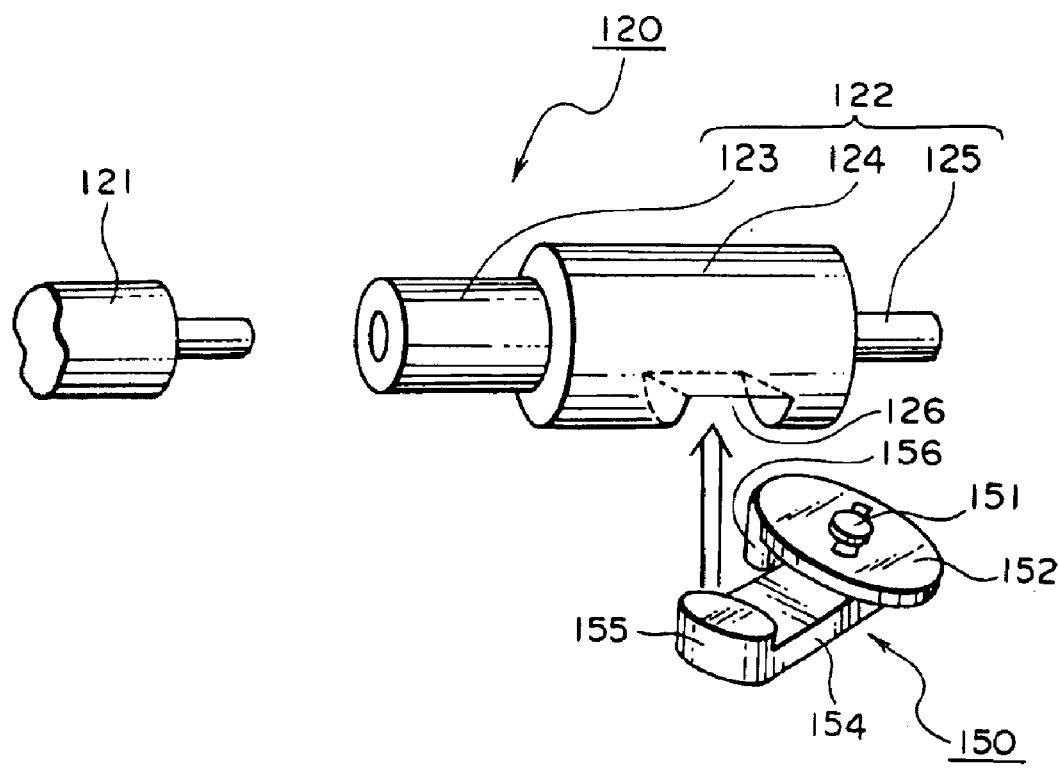
FIG. 19 is a perspective view showing the crank member of FIG. 15 and a rod member.

The rod member 120 is comprised of two parts 121, 122, as shown in FIG. 19. The part 121 is inserted into the solenoid mechanism 110 and is movably supported by the solenoid mechanism 110, as mentioned above. The other part 122 is fitted to the tip of the part 121 and is comprised of a fitted portion 123, a large-diameter portion 124 and a guided portion 125, which continue to each other in this order. The large-diameter portion 124 is formed with a groove 126, which extends in a direction perpendicular to the axial direction of the rod member 120. As shown in FIGS. 5 and 6, the guided portion 125 is slidably inserted into a guide hole 130a formed in a guiding wall 130 so that the movement of the rod member 120 in the Y-direction is guided by the guiding wall 130.

The guiding wall 130 and the main part of the solenoid mechanism 110 provide a movable range of the rod member 120 between a first rod position and a second rod position. The first rod position is a position where the large-diameter portion 124 is in contact with the guiding wall 130. The second rod position is a position where the large-diameter portion 124 is farthest away from the guiding wall 130.

On the part 121 and the fitted portion 123 and between the main part of the solenoid mechanism 110 and the large-diameter portion 124, a coil spring 140 is provided. The coil spring 140 incites the rod member 120 to be positioned at the first rod position. When the solenoid mechanism 110 turns on by receiving electric currents through the power supply lines 111, the rod member 120 is moved forward in the Y-direction to be positioned at the second rod position, opposing the coil spring 140.

On the bottom surface 11b of the main plate 11 of the base insulator 10, a crank mechanism or member 150 is also provided, as shown in FIGS. 5 to 9. The crank member 150 is comprised of three parts: a shaft 151, a main part 152 and a base part 153, as shown in FIGS. 15 to 18. The base part 153 has a short cylinder and is fixed on the bottom surface 11b of the main plate 11 of the base insulator 10. The shaft 151 extends from the center of the base part 153 and has at its free end a key 151a which extends in a direction perpendicular to an axial direction of the shaft 151. The main part 152 has a disc-like shaped portion which has a center hole and a key groove 152a connected thereto. After the key 151a is inserted into the key groove 152a while the shaft 151 is inserted into the center hole of the main part 152, the main part 152 is rotated so that the main part 152 is positioned between the base part 153 and the key 151a and is prevented from being off the shaft 151. In this state, the main part 152 is rotatably supported by the shaft 151, which serves as a center axis of the main part 152.

Figure 16:
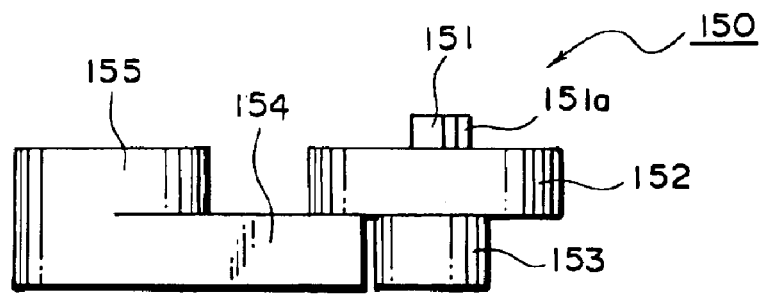
FIG. 16 is a side view of the crank member of FIG. 15.
Figure 17:
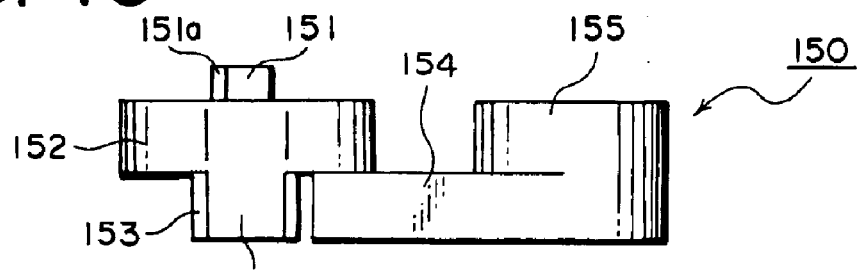
FIG. 17 is another side view of the crank member of FIG. 15.

On the lower surface of the main part 152 in FIGS. 16 and 17, an arm portion 154 is connected. The arm portion 154 extends in a direction perpendicular to the center axis of the main part 152. At the free end of the arm portion 154, a cylindrical projection 155 is formed. The projection 155 projects in a direction parallel to the shaft 151. The projection 155 is fitted within the groove 126 of the rod member 120, as shown in FIG. 19. The projection 155 is sized to be suitably received within the groove 126 of the rod member 120, as shown in FIGS. 5 and 6. Therefore, when the rod member 120 moves in the axial direction thereof, the projection 155 can rotate and slide within the groove 126 of the rod member 120, while pivoting upon the shaft 151, as seen from the FIGS. 5 and 6.

Figure 15:
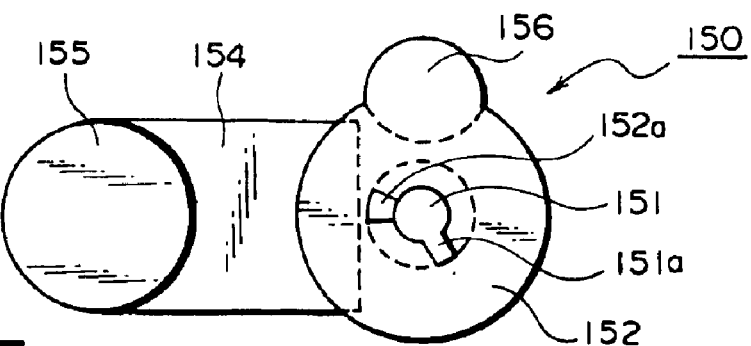
FIG. 15 is a top view of a crank member which is shown in FIG. 5.
Figure 18:
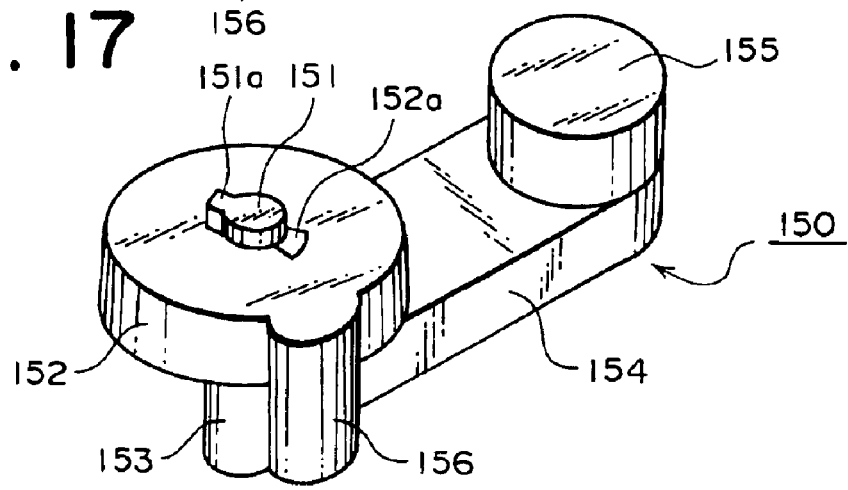
FIG. 18 is a perspective view of the crank member of FIG. 15.

The main part 152 is also formed with a pressing portion 156, as shown in FIGS. 5, 6, 15, 17 and 18. The pressing portion 156 extends in the same direction as the projecting direction of the projection 155, as shown in FIGS. 15 and 18. The pressing portion 156 is arranged away from the shaft 151. In this embodiment, a line passing through the pressing portion 156 and the shaft 151 and the arm portion 154 make a right angle, as shown in FIG. 15. When the projection 155 pivots upon the shaft 151, the pressing portion 156 also pivots upon the shaft 151 so that the straight movement of the rod member 120 is converted, by the crank member 150, into the pivoting or rotating movement of the pressing portion 156. The rotational movement of the pressing portion 156 provides a rotation force on the pressed portion 84 of the locking member 80. In detail, when the rod member 120 is positioned at the first rod position, the pressing portion 156 is positioned on the side of the pressed portion 84 of the locking member 80, as shown in FIG. 5. In other words, the pressing portion 156 is in contact with the side of the pressed portion 84. When the rod member 120 is moved from the first rod position towards the second rod position, the pressing portion 156 pivots upon the shaft 151 so that the pressing portion 156 presses the pressed portion in a direction perpendicular to the axial direction of the shaft 151.

Figure 21:
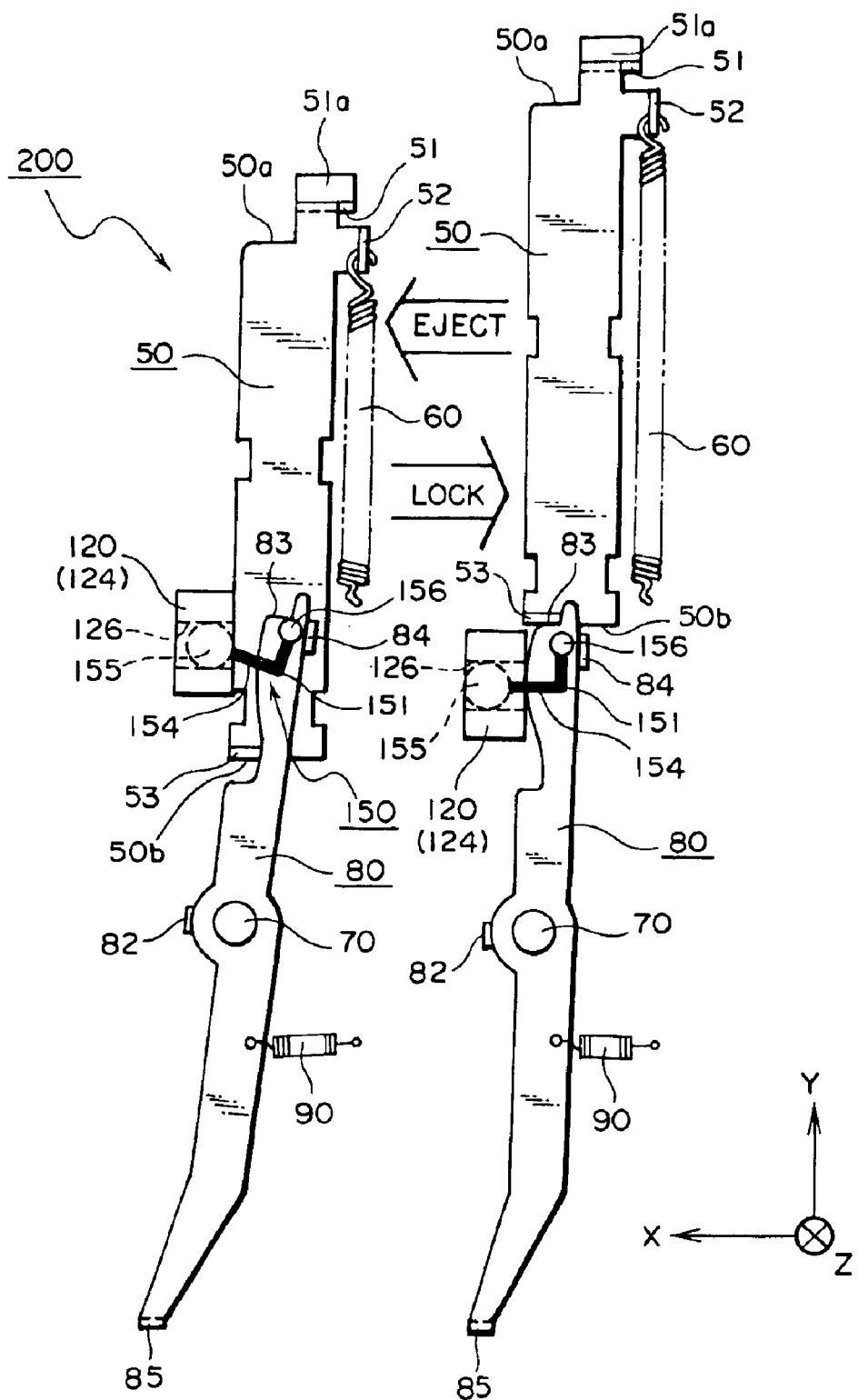
FIG. 21 is a view schematically showing the locked state and the unlocked state of the card slot assembly, as seen from the bottom thereof.

With reference to FIG. 21, explanation is directed to the operations of the ejection mechanism according to the embodiment mentioned above. FIG. 21 shows the ejection mechanism as seen from the bottom thereof.

As illustrated in the right side of FIG. 21, when the ejection plate 50 is moved to the locked position against the coil spring 60, the locking member 80 turns counterclockwise in accordance with the force of the spring 90. As a result, the L-like shaped locking portion 83 of the locking member 80 receives the locked portion 53 of the ejection plate 50 so as to lock the ejection plate 50 at the locked position. During this movement, the rod member 120 is moved to the first rod position.

When the solenoid 110 is turned on, the rod member 120 is moved to the second rod position. As illustrated in the left side of FIG. 21, the crank member 150 converts the straight movement of the rod member 120 into the rotation force and transmits the rotation force to the pressed portion 84 of the locking member 80. Thereby, the locking portion 83 is moved away from the locked portion 53 so that the locking member 80 unlocks the ejection plate 50. Then, the ejection plate 50 is allowed to be moved to the ejecting position in accordance with the force of the coil spring 60.

As described above, the unlocking of the movement of the ejection plate 50 is controlled by the operation of the solenoid mechanism 110 in the embodiment. Therefore, the card slot assembly 200 can be used in the following manner for the reliable data transmission between the electronic instrument provided with the card slot assembly 200 and the card 300 inserted into the card slot assembly 200. It is detected whether the card is accessed by the electronic instrument. Such a detection can by achieved by monitoring the data transmission, and the monitoring can be easily achieved in the form of a hardware or a software. The detection may use another detection of the condition of the switch 100. The solenoid mechanism 110 is allowed to move the rod member 120 to the second rod position only when the electronic instrument does not access the card. In the above-mentioned embodiment, the solenoid mechanism 110 is turned on only when the electronic instrument does not access the card. During the data transmission, the solenoid mechanism 100 is turned off and is forced to keep the rod member 120 at the first rod position. In the above-mentioned application, the highly reliable data transmission is achieved because there is no misoperation of an eject button.

What is claimed is:

1. A card slot assembly which has a card receiving portion for receiving a card in an insertion direction within the card slot assembly, the card slot assembly comprising:

card ejector, which is movable along the insertion direction between a locked position and an ejecting position, wherein the card ejector moves to the locked position when the card is received within the card slot assembly, while the card ejector exerts on the received card an ejection force in an ejection direction opposite to the insertion direction when the card ejector moves from the locked position to the ejecting position;

actuator, which is coupled to the card ejector and urges the card ejector to be positioned at the ejecting position;

a pivot;

a locking member, which is rotatably supported by the pivot, wherein a rotational range of the locking member is between a first rotational position and a second rotational position, the locking member locks the card ejector at the locked position when the locking member is positioned at the first rotational position, and the locking member unlocks the card ejector when the locking member is positioned at the second rotational position, so as to allow the card ejector to move in the ejecting direction in accordance with the actuator;

a solenoid mechanism supporting a rod member movably in an axial direction of the rod member between a first rod position and a second rod position; and crank mechanism, which is coupled to the rod member and is positioned close to the locking member, wherein, when the rod member moves from the first rod position to the second rod position, the crank mechanism converts the movement of the rod member into a rotation force and rotates the locking member from the first rotational position towards the second rotational position by means of the rotation force.

2. The card slot assembly according to claim 1, wherein: the rod member is provided with a groove, which is formed in the rod member and extends in a direction perpendicular to the axial direction; the crank mechanism comprises a main portion and an arm portion; the main portion has a center axis; the arm portion extends in an extending direction and is coupled to the main portion so that one end of the arm portion is able to pivot upon the center axis of the main portion; and the arm portion is provided with a projection, which projects in a projecting direction perpendicular to the extending direction and is fitted within the groove so that the projection is able to rotate and to slide within the groove and is able to pivot upon the center axis of the main portion when the rod member moves between the first and the second rod positions.

3. The card slot assembly according to claim 2, wherein: the locking member has a pressed portion; the crank mechanism further comprises a pressing portion, which is supported by the main portion apart from the center axis so that the pressing portion pivots upon the center axis of the main portion when the projection pivots upon the center axis; and the pressing portion is in contact with the pressed portion when the rod member is positioned at the first rod position, while the pressing portion presses the pressed portion when the rod member is moved towards the second rod position.

4. The card slot assembly according to claim 3, wherein the pressed portion and the pressing portion extend in the same direction as the projecting direction of the projection so that, when the pressing portion pivots upon the center axis, the pressing portion presses the pressed portion in a direction perpendicular to the projecting direction.

5. The card slot assembly according to claim 1, further comprising compelling means for compelling the locking member to be positioned at the first rotational position so that, when the rod member moves from the first rod position to the second rod position, the crank mechanism supplies the rotation force on the locking member, opposing the compelling means.

6. The card slot assembly according to claim 1, wherein: the solenoid mechanism is provided with inciting means for inciting the rod member to be positioned at the first rod position; and, when the solenoid mechanism is turned on, the rod member moves to the second rod position, opposing the inciting means.

7. The card slot assembly according to claim 1, further comprising a base insulator, on which the card ejector, the pivot, the locking member, the solenoid mechanism and the crank mechanism are mounted, wherein: the base insulator is formed with a slit; the locking member is provided with a protrusion which is accommodated in the slit and is movable within the slit; and the protrusion and the slit restrict the rotation range of the locking member to a predetermined range which includes the first and the second rotational positions.

8. The card slot assembly according to claim 7, wherein: the base insulator has top and bottom surfaces and an opening between the top and the bottom surfaces; the card ejector, the pivot and the locking member are provided on the top surface, while the solenoid mechanism and the crank mechanism are provided on the bottom surface; and the locking member and the crank mechanism are accessible to each other through the opening.

9. The card slot assembly according to claim 1, wherein the axial direction of the rod member is the same direction as the insertion direction.

10. The card slot assembly according to claim 1, wherein: the card ejector comprises an ejection plate elongated in the insertion direction; the ejection plate has a first end and a second end which is nearer to the card receiving portion than the first end; and the ejection plate is provided with a standing-wall portion which is formed at the first end and is laid on a plane perpendicular to the insertion direction so that, when the card is inserted into the card slot assembly, the standing-wall portion receives a force caused by the insertion of the card and moves the ejection plate to the locked position, while, when the ejection plate moves from the locked position to the ejecting position, the standing-wall portion exerts the ejection force on the card.

11. The card slot assembly according to claim 1, wherein: the locking member is provided with a stopper portion, which is positioned away from the pivot and near to the card receiving portion and turns in accordance with the movement of the locking member so that, when the card is received within the card slot assembly and the locking member is positioned at the first rotational position, the stopper portion is positioned nearer to the card receiving portion than the received card to prevent the card from going out of the card slot assembly.

12. The card slot assembly according to claim 1, further comprising a switch and a slider slidable along the insertion direction in accordance with the movement of the card being received within the card slot assembly, wherein the slider is provided with a control portion which turns on the switch when the card is completely received within the card slot assembly and which turns off the switch when the card is ejected from the card slot assembly.

* * * * *